(12) United States Patent
Setty et al.

(10) Patent No.: US 8,046,809 B2
(45) Date of Patent: Oct. 25, 2011

(54) MULTICAST SERVICES CONTROL SYSTEM AND METHOD

(75) Inventors: Christopher K. Setty, Coeur d'Alene, ID (US); Jose J. Debarros, Spokane, WA (US); Barbara R. Sinnott, Spokane, WA (US); Michael J. Chartier, Veradale, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 2028 days.

(21) Appl. No.: 10/882,814

(22) Filed: Jun. 30, 2004

(65) Prior Publication Data

US 2006/0015928 A1 Jan. 19, 2006

Related U.S. Application Data

(60) Provisional application No. 60/484,033, filed on Jun. 30, 2003.

(51) Int. Cl.
*H04N 7/173* (2011.01)
(52) U.S. Cl. ............... 725/93; 725/95; 725/96; 725/97
(58) Field of Classification Search .............. 725/93, 725/95–97
See application file for complete search history.

(56) References Cited

U.S. PATENT DOCUMENTS

| | | | |
|---|---|---|---|
| 5,812,552 A | 9/1998 | Arora et al. | 370/401 |
| 5,892,924 A | 4/1999 | Lyon et al. | 395/200.75 |
| 5,920,699 A | 7/1999 | Bare | 395/200.55 |
| 5,920,705 A | 7/1999 | Lyon et al. | 395/200.7 |
| 5,999,530 A | 12/1999 | LeMaire et al. | 370/390 |
| 6,169,741 B1 | 1/2001 | LeMaire et al. | 370/401 |
| 7,500,261 B1 * | 3/2009 | Myers | 725/105 |
| 2001/0040895 A1 | 11/2001 | Templin | |
| 2002/0003780 A1 | 1/2002 | Braun et al. | |
| 2002/0009073 A1 | 1/2002 | Furukawa et al. | |
| 2002/0012320 A1 | 1/2002 | Ogier et al. | |
| 2005/0120378 A1 * | 6/2005 | Jalonen | 725/97 |

* cited by examiner

*Primary Examiner* — Hunter Lonsberry
(74) *Attorney, Agent, or Firm* — Clements Bernard PLLC; Christopher L. Bernard; Lawrence A. Baratta, Jr.

(57) ABSTRACT

A multicast services control system is provided for Internet protocol television transport. The system includes a service distribution platform, at least one service concentration platform, and at least one set-top box. The service distribution platform has a multicast table. The service distribution platform is configured to receive channels from an Internet protocol video source and the multicast table is configured to include an entry for each of the channels. The at least one service concentration platform communicates with the service distribution platform for forwarding "leaves" and receiving "joins" with the service distribution platform. The at least one set-top box includes a receiving port and is configured to generate "leaves" and forward the "leaves" to one or more of the at least one service concentration platform wherein the "leaves" are snooped by portals and concentrators and wherein the set-top box is further configured to receive "joins" from one or more of the at least one service concentration platform. A method is also provided.

29 Claims, 4 Drawing Sheets

MULTICAST SERVICES CONTROL SYSTEM AND METHOD

RELATED PATENT DATA

This application claims priority from U.S. Provisional Patent Application Ser. No. 60/484,033, which was filed Jun. 30, 2003, and which is incorporated by reference herein.

TECHNICAL FIELD

The present invention pertains to apparatus and methods for improving communications in digital networks. More particularly, the present invention relates to multicast services control of digital information over a digital network.

BACKGROUND OF THE INVENTION

Traffic management is important in digital networks. Traffic management involves the controlling and scheduling of traffic through paths established through a network. The traffic can include audio, video, or any form of digital information. The individual streaming of television channels on a network typically requires the involvement of a multicast router because there is an inability to control multicast streams at lower layers in an Open Systems Interconnection (OSI) model. For example, the provision of multicast video services over an Ethernet broadband network requires the use of a multicast router to enable control of multicast streams of television channels.

According to one previously known technique, Internet Group Management Protocol (IGMP) enabled multicast switches are designed to "snoop" IGMP membership reports and "leaves" based upon queries from an upstream, multicast router. However, current router-based multicast services are adversely affected by complex multicast routing protocols and the processing overload experienced by routers due to thousands of channel changes occurring downstream.

Additionally, such previously known technique uses expensive routers that are specialized for use in implementing multicast control. Furthermore, this technique uses complex Internet Protocol (IP) address and router protocol design. Even more, there exists a performance degradation due to video service subscriber increases.

Also according to previous known techniques, presently available Ethernet gear can be configured to enable the sending of one multicast stream of digital information from a server to multiple endpoints. However, problems arise with such previously known technique when trying to stream more than one multicast stream on the same network. IGMP snooping was previously designed in order to solve this basic problem. However, difficulties are encountered when attempting to deliver 100 channels of video to 1,000 different subscribers over an Ethernet network using presently available off-the-shelf gear. More particularly, such a solution still requires the use of a Layer-3 router configured to run IGMP. There presently exists several routers that are commercially available that are capable of such configuration. However, such routers are presently very expensive, particularly when such a router is provided for solely implementing present tasks. Secondly, channel-change latency becomes a problem as the number of channels, hosts, and "hops" is increased between the router and an end user. Finally, Layer-2 devices are typically not designed to respond quickly in response to a topology change. As a result, there can be a loss of service to the customer.

SUMMARY OF THE INVENTION

A multicast digital information services control system is provided for Internet protocol (IP) information transport. The system provides channel streaming of digital information including video and audio without the use of a router. The solution is able to solve Internet protocol (IP) television transport issues while reducing overall complexity and alleviating IP addressing concerns. The system provides completely Level 2 control of broadband television services over a network.

According to one aspect, a multicast video service control system is provided for Internet protocol television transport. The system includes a service distribution platform, at least one service concentration platform, and at least one set-top box. The service distribution platform has a multicast table. The service distribution platform is configured to receive channels from an Internet protocol video source and the multicast table is configured to include an entry for each of the channels. The at least one service concentration platform communicates with the service distribution platform for forwarding "leaves" and receiving "joins" with the service distribution platform. The at least one set-top box includes a receiving port and is configured to generate "leaves" and forward the "leaves" to one or more of the at least one service concentration platform wherein the "leaves" are snooped by portals and concentrators and wherein the set-top box is further configured to receive "joins" from one or more of the at least one service concentration platform.

According to another aspect, a method is provided for controlling multicast video service. The method includes: providing a service distribution platform having a multicast table, at least one service concentration platform, a portal site, and at least one set-top box; receiving channels at the service distribution platform from an Internet protocol video source; providing an entry in the multicast table for each of the channels; generating a "join" or a "leave" at a set-top box; snooping messages from the set-top box to identify one or more "joins" and "leaves"; forwarding an identified "join" or "leave" to the service distribution platform from the portal site via the service concentration platform; forwarding an identified "join" or "leave" to the service distribution platform from the portal site via the service concentration platform; and forwarding the "join" or the "leave" to one or more of the at least one service concentration platform wherein the "join" or the "leave" is snooped by portals and concentrators and wherein the set-top box is further configured to receive additional "joins" or "leaves" from one or more of the at least one service concentration platform.

According to yet another aspect, a system is provided for communicating between a first point and a second point on a computer network such that no router is required. The system includes a service distribution platform, at least one service concentration platform, at least one portal site, and at least one set-top box. The service distribution platform has a multicast table and is configured to receive channels from an Internet protocol video source. The multicast table is configured to include an entry for each of the channels and to add and delete receiving ports via "joins" and "leaves" associated with the entry for each channel in the multicast table. The at least one service concentration platform communicates with the service distribution platform for forwarding "leaves" and "joins" with the service distribution platform. The at least one portal site communicates with the service concentration platform. The at least one set-top box includes a receiving port. The at least one set-top box is configured to generate "leaves" and "joins" and forward the "leaves" and "joins" to one or more of the at least on service concentration platform. The "leaves" and "joins" are snooped by one or more of the at least one portal.

An advantage results because channel streaming is provided without having to use a router. Another advantage is provided because overall system complexity is reduced. A further advantage results because IP addressing concerns are alleviated.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising a system and method for joining and leaving channel streams via router-less multicast video service control. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

As used herein, "streaming digital multicast services" (SDMS) is intended to refer to the process of sending information from one source to multiple endpoints over a digital network. For example, SDMS comprises the process of streaming a video program from one server to several hosts over an IP/Ethernet network.

As used herein, the term "Internet Group Management Protocol" (IGMP) is intended to refer to a standard networking protocol belonging to the TCP/IP family of protocols. IGMP can be found on many Layer-3 routers that are presently commercially available.

As used herein, the term "IGMP snooping" is intended to refer to a technique used by Layer-2 devices for monitoring IGMP activity on a network. IGMP snooping is not a protocol itself, and it presently is much less common in the Ethernet world compared to IGMP in the TCP/IP world. IGMP snooping is presently a proposed standard in the Internet Engineering Task Force (IETF).

As used herein, the term "Distributor" is intended to refer to a large, Layer-2 Ethernet switch designed to aggregate traffic from thousands of subscribers.

As used herein, the term "Concentrator" is intended to refer to a term similar to a distributor, but designed to aggregate network traffic from one or two dozen subscribers.

As used herein, the term "Portal" is intended to refer to a Layer-2 Ethernet switch, typically located at a customer location, or premises.

The following description provides one exemplary implementation for implementing channel streaming over a digital information network comprising a multicast video service control system for internet protocol television transport. However, it is understood that channel streaming can be implemented with any of a number of services, including video, audio, or any other form of digital information. Channel streaming is used to take a group of digital information services and configure them to flow down into a digital network into several channels so as to get the digital information close to an end user so the end user can access the digital information very quickly. Such an implementation is made readily available for digital networks that have capacity, such as extra bandwidth, that enables the flow of digital services closer in proximity to an end user so that the end user can retrieve them more quickly. Accordingly, the end user experiences a reduction in channel change latency (by way of example) when changing channels while watching video over such a digital network. The digital information (or data) is pushed down the network, even though no specific end user has requested the digital information. For example, channels 1-40 can be sent down a network 24 hours a day, seven days a week, so that channels 140 are close to specific end users and so that the end users can retrieve channels 140 very quickly.

Channel streaming is intended to improve behavior of almost any Ethernet topology. However, benefits of channel streaming become more important as the size of the network is increased, and the number of "hops" between a client and a server increases. In a typical access-space network, there can exist five or more "hops" between a multicast server and a multicast client (i.e., a set-top box). For example, "hops" can occur progressively from a server, a router, a distributor, a concentrator, a portal, and a set-top device (or box). When a set-top device makes a request to receive a particular multicast stream, a message is sent from the set-top device to the router. This message is then required to be processed by each device along the path from the set-top device to the router, and each device will add a certain amount of latency to this request. When the router finally receives the message, the router begins to forward the desired multicast stream to the set-top device. A maximum end-to-end latency allowed in such a system is about 100 milliseconds, but a single piece of Ethernet gear could easily cause 200 milliseconds of latency by itself, unless IGMP messages are handled efficiently and with high priority relative to other messages and tasks. This problem gets worse as the size of a network grows. One of the goals of channel streaming is to reduce (or eliminate) this latency as much as possible.

The basic concept of the present invention is to define a set of static multicast groups, and then flood those groups to all ports in the virtual local area network (VLAN) all the time. This technique can be used in order to bring multicast services down into the network (in closer proximity to an end user) before any host actually has joined the group. Latency is thereby reduced because the IGMP "join" message does not need to propagate all the way to the router. In fact, if a channel stream is configured such that multicast groups flow all the way to the portal, then the portal is the only switch that needs to process the "join" message in order to flow the multicast group to the end user.

According to the present invention, channel streaming (or channel stream) is configured to overcome the above problems within a typical network topology. More particularly, channel stream comprises a collection of technologies that are intended to improve the way streaming digital multicast services (SDMS) are supported on a Layer-2 Ethernet network. Specifically, channel stream is designed to provide several benefits. First, channel stream reduces the overall cost of a network by eliminating the need for a Layer-3 router. Secondly, channel stream reduces the complexity of a network configuration and maintenance. Thirdly, channel stream reduces the latency associated with a "channel change" event, as much as possible. Fourthly, channel stream increases the number of multicast streams that are supported by a network. Finally, channel stream increases the number of multicast hosts that are supported by a network.

A number of technologies are utilized in order to make up channel stream: (1) static multicast groups; (2) unresolved multicast filtering (UMF); (3) well-known multicast forwarding (WKMF); (4) IGMP query engine; (5) rapid response to topology changes; (6) channel change heuristics; (7) each VLAN is a separate domain for multicast services; each service provider can have their own VLAN; (8) high priority processing for IGMP packets; (9) security features; (10) inquisitive leave or fast leave; (11) active-linger mode; and (12) proxy query.

According to the present implementation, channel streaming (or channel stream) is used to force a selected group of multicast streams (of services) to flow down into a digital network before the services are requested by any multicast hosts within the digital network. As a result, channel-change latency is reduced, and load on a router is also reduced. Secondly, channel stream can be used to eliminate the need for a router within a digital network. In contrast, TCP/IP services presently use a router which can be costly and complex.

According to the implementation depicted herein, channel stream provides an interface between a user and a video source. Channel stream is implemented in an Ethernet switch via a distributor and a concentrator. By using software within a distributor and concentrator, the need for a router is eliminated. In order to implement this feature, unresolved multicast filtering (UMF) is provided on every Ethernet switch that is running channel stream. UMF enables the dropping of channels that are not being utilized.

Figure 1:
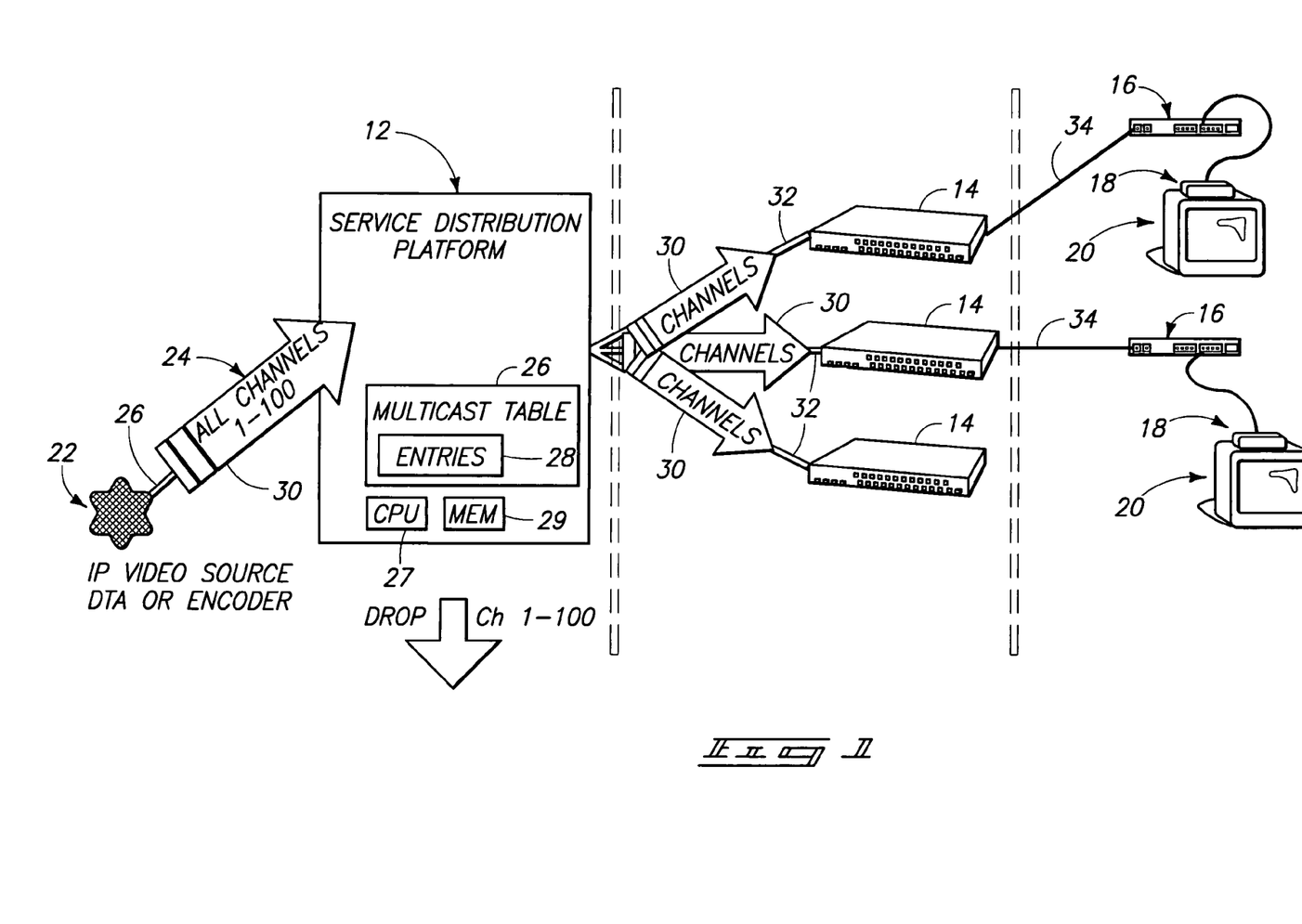
FIG. 1 is a diagrammatic illustration of a multicast video service control system depicting channel stream architecture.

FIG. 1 illustrates a system 10 for providing multicast video services over an Ethernet broadband network without requiring the use of a multicast router. However, other digital information can also be multicast via a channel streaming, such as voice information. System 10 is configured to implement multicast video control, without use of a router, to enable Layer 2 Ethernet broadband devices to receive channels, filter the channels, and distribute the channels. Each of these functions is carried out based upon Internet Group Management Protocol (IGMP) membership reports and IGMP leaves. Individual channels can be programmed into the access switches via manual input, via integration with third party interactive television management software, or via a network supervisor.

For purposes of this disclosure, the term "multicasting" refers to one-to-many transmission, or broadcasting to multiple users at once. Typically, a receiver decides whether to join a specific multicast transmission.

Figure 2:
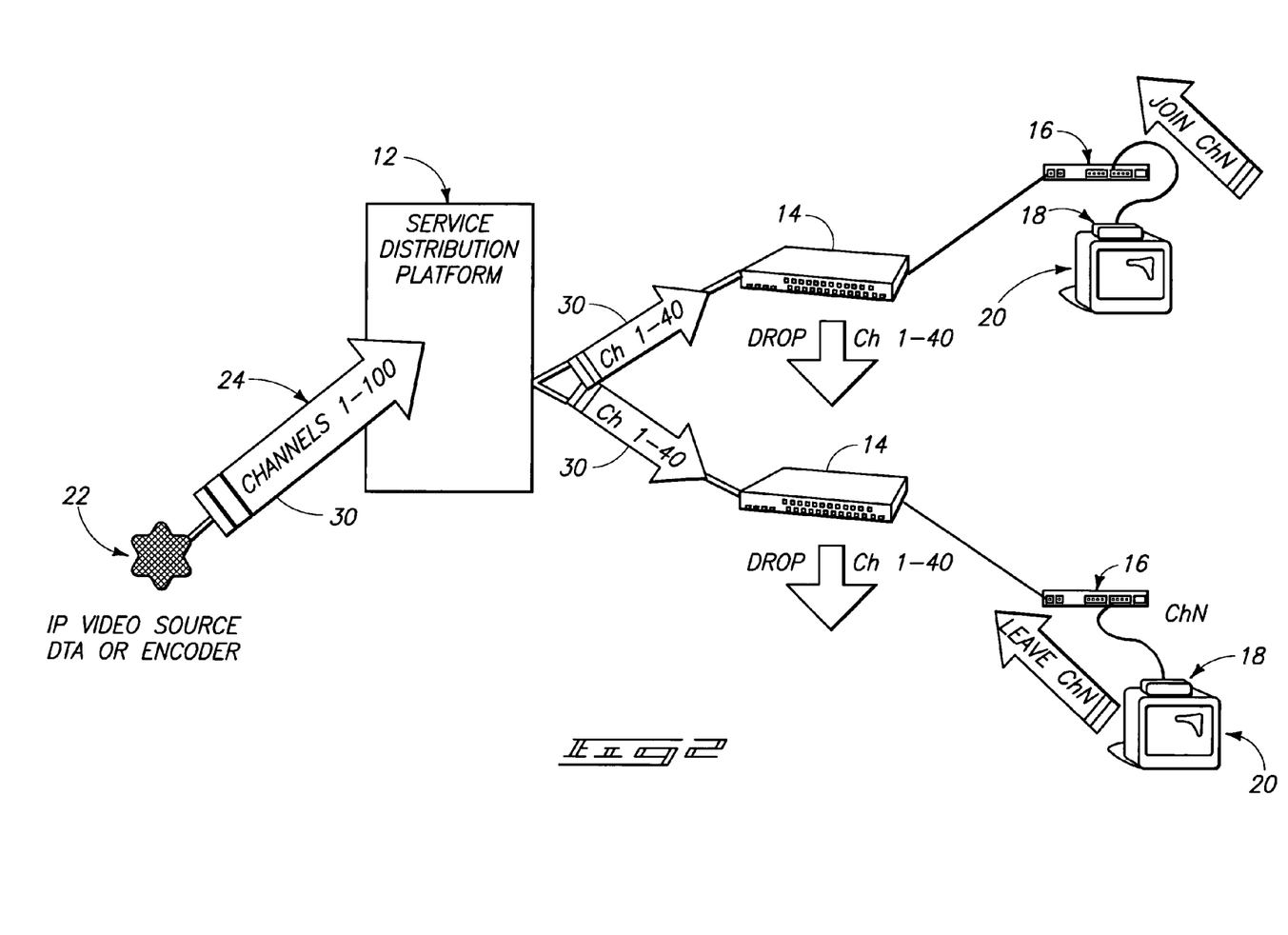
FIG. 2 is a diagrammatic illustration of a first step for leaving a channel stream pursuant to the system and method of FIG. 1.
Figure 3:
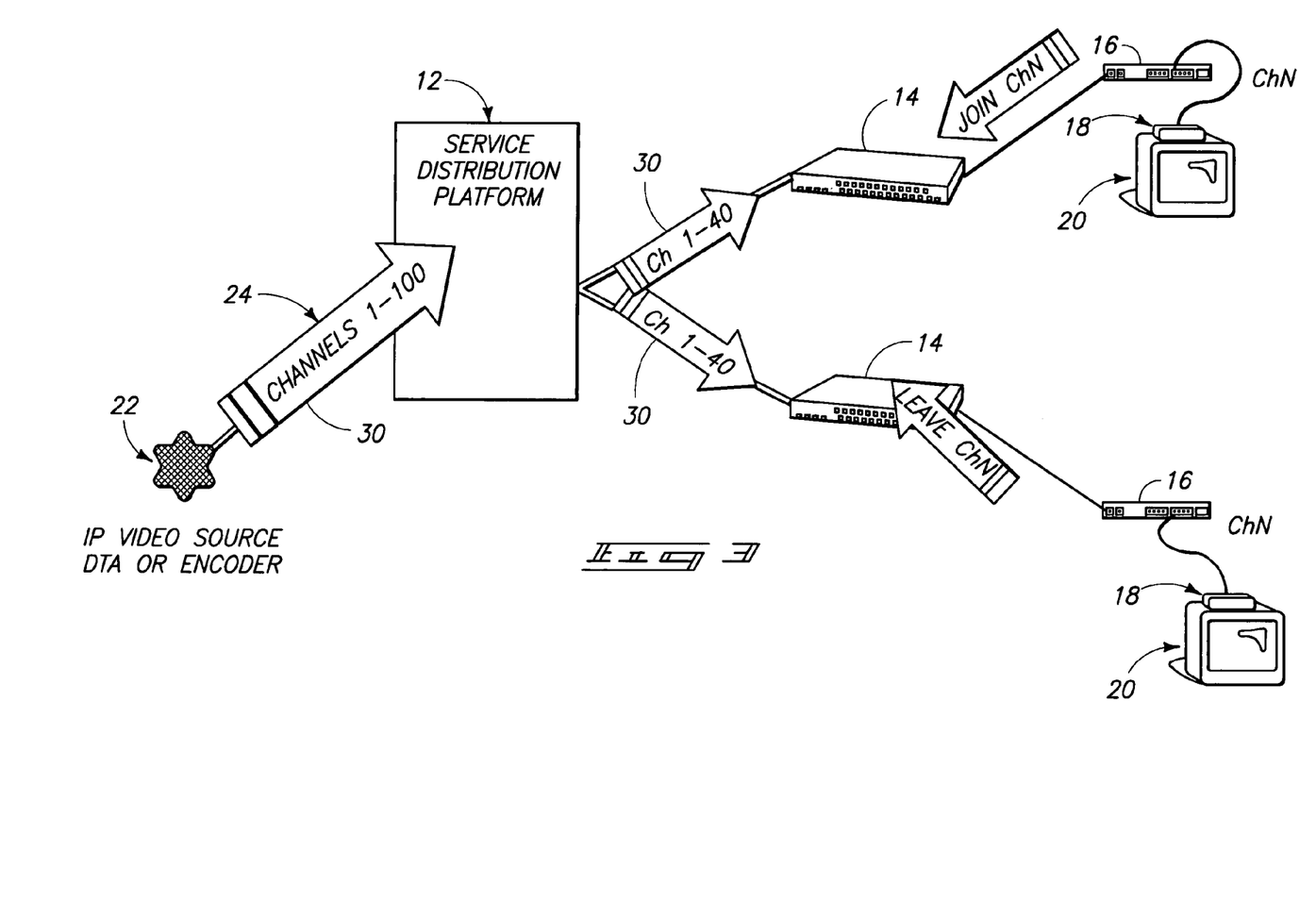
FIG. 3 is a diagrammatic illustration of a second step for leaving a channel stream pursuant to the system and method of FIG. 1.
Figure 4:
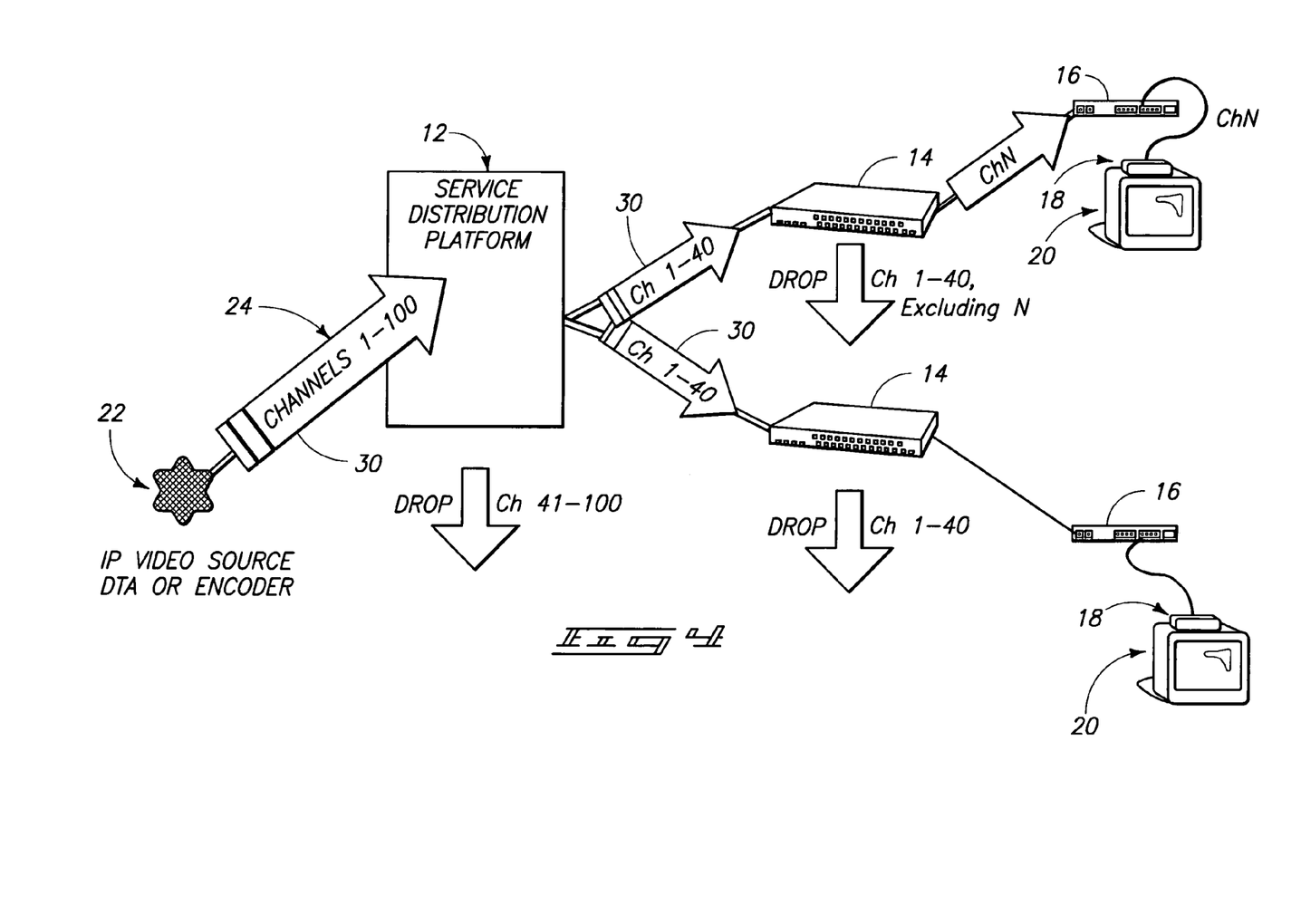
FIG. 4 is a diagrammatic illustration of a third step for leaving a channel stream pursuant to the system and method of FIG. 1.

As shown in FIG. 1, system 10 includes a service distribution platform 12, a service concentration platform 14, portal sites 16, and set-top boxes 18. Set-top boxes 18 are provided in association with television sets 20. An Internet protocol (IP) video source 22 provides a range of channels comprising "all channels" 24 that are delivered over a communication link 26 to service distribution platform 12. By way of example, "all channels" 24 comprises a set of sequentially numbered video channels 1-100, as shown in FIGS. 2-4. The set of "all channels" 24 are sent to service distribution platform 12 from source 22 where a multicast table 26 includes an entry 28 for each individual channel 30 within set of "all channels" 24. Individual channels 30 are manually placed into multicast table 26. Alternatively or additionally, individual channels 30 can be dynamically learned and filtered upon ingress into service distribution platform 12. As shown in FIG. 1, services distribution platform 12 drops all of channels 1-100 for the case where a "join" has not been sent for any channel.

Service distribution platform 12 distributes selected channels, such as channel 30, over communication links 32 to individual service concentration platforms 14 based upon "joins". The service concentration platforms 14 send "join" messages for "n" channels, such as channel 30, based on configuration.

Service concentration platforms 14 distribute the "n" channels that have been "joined", such as channel 30, via communication links 34 to portal sites 16. Portal sites 16 deliver the "n" channels to set-top boxes 18 and television sets 20. In operation, portal sites 16 update multicast tables based on IGMP snooping of messages from the set-top boxes 18.

FIGS. 2-4 illustrate in steps the "leave" message processes and the "join" message processes that trigger port subtractions and additions, respectively, to the multicast tables. Although the "leave" processes are described in detail with reference to such Figures, it is understood that the "join" processes work similarly. However, the "join" processes trigger additions to the multicast tables, instead of subtractions. Otherwise, the same logic is used in order to determine upstream forwarding of channel streams that are "joined".

According to FIG. 2, a first step comprises set-top box 18 (in the lower branch) sending a "leave" message for a selected channel "n", such as channel 30. A portal table 36 within corresponding portal site 16 is altered in order to remove a receiving port 38 corresponding to the selected channel 30 from the multicast entry for channel "n". Set-top box 18 (in the upper branch) sends a "join" for a selected document t "n" to corresponding portal site 16.

As shown in FIG. 2, channels 140 are illustrated as streaming from service distribution platform 12 to service concentration platform 14. Service concentration platform 14 is shown dropping all of channels 1-40. Accordingly, FIG. 2 illustrates what happens when channels 1-40 are configured on service distribution platform 12.

In order to implement the above-described feature, portal site 16 implements the following logic:

If Channel "n" has current membership on another port (i.e., another television set within a particular home is watching channel "n"),
Do not forward leave up to service concentration platform,
Else
Forward leave up to service concentration platform FIG. 3 illustrates a second step in the process comprising the delivery of a "leave" message from set-top box 18 via portal site 16 to service concentration platform 14 (in the lower branch). The "leave" message is received by service concentration platform 14 if no other members are present on the associated portal site 16. However, if there exists another member on portal site 16, then the "leave" message is not received by service concentration platform 14. Multicast table 26 (see FIG. 1) is then altered in order to remove the respective receiving port, or portal site 16 from the channel "n" multicast entry within table 26. Likewise, set-top box 18 delivers (or forwards) a "join" message to a respective service concentration platform 14 (in the upper branch).

In order to implement the above-described feature, the following logic is implemented:

If (Channel "n"=Channel 1-40), then Service Concentration Platform doesn't forward the leave to the Service Distribution Platform If (Channel "n"≠Channel 1-40 AND there are other port members for Channel "n"s multicast tale entry, then the Service Concentration Platform doesn't forward the leave to the Service Distribution Platform If (Channel "n"≠Channel 1-40) AND there are no other port members for Channel "n"s multicast table entry, then the Service Concentration Platform forwards the leave to the Service Distribution Platform FIG. 4 illustrates a fourth step in the process comprising the service concentration platform 14 forwarding the "leave" message for channel "n" from the service distribution platform 12, assuming the criteria for this action are met. The multicast table 26 in the service distribution platform 12 is altered and the receiving port, or portal site 16 is removed from the multicast table entry for Channel "n".

According to the above-described implementation, no further logic is necessary because "leave" messages should only make it this far if the source of the "leave" was the last member of channel "n" on that particular service distribution platform 12. In other words, no one else on the entire network is watching that particular channel, channel "n".

As shown above with reference to FIGS. 2-4, it is understood that the process of joining a channel stream (a "join") is similar to leaving a channel stream (a "leave"). However, a "join" triggers an addition to the multicast tables, whereas a "leave" triggers a subtraction from the multicast tables. Otherwise, the same logic is used to determine upstream forwarding when implementing a "join".

As shown in FIG. 4, a network administrator can be used to configure service distribution platform 12 either manually or by communicating with a middle ware server (such as part of a video server) in order to auto configure service distribution platform 12. Service distribution platform 12 forwards 40 channels to the service concentration platforms (concentrators) 14 by way of unresolved multicast filtering (UMF), the service concentration platforms 14 that did not ask for these channels will then drop channels 1-40. Accordingly, service concentration platforms 14 that did not ask for the channels will receive the channels and drop the channels.

In operation, a set-top box 18 sends a "join" message to a portal site 16. The portal site is essentially a standard portal site, and the video source is also a standard video source. Secondly, a portal site 16 runs IGMP snooping, and they forward the "join" message to the service concentration platform (concentrator) 14. Accordingly, video (and other digital information) will flow to a set-top box quicker because the "join" messages are not sent all the way to a service distribution platform 12, or to a router.

In contrast, prior art techniques send such a "join" message to a router that is positioned between the video source 22 and service distribution platform 12, as shown in FIG. 4. The prior art use of a router filters video/multicast traffic, runs IGMP protocol, and generates IGMP query messages.

The present implementation eliminates a router. Instead, service distribution platform 12 is used to generate IGMP query messages, without the provision of a router.

According to one exemplary construction, there exist three techniques for programming a multicast table. The first is static, the second is automatic, and the third is integrated.

Pursuant to the first, static technique, ranges of multicast groups can be defined by an operator. A network supervisor is then used to fill in the individual channels for table entering. Accordingly, a network supervisor can manually identify each element that is desired to flow through the network down to the portal(s).

Pursuant to a second, automatic technique, all streams from a source are filtered by a filter as they ingress to the service distribution platform. Multicast groups are then gleaned from actual streams, and table entries are made accordingly.

Pursuant to a third, integrated technique, a network supervisor is interfaced to one or more middleware platforms. Next, multicast tables are programmed from channel databases.

According to one implementation, the system can operate in multiple modes including an IGMP mode (where channel streaming is turned off) and a channel streaming mode. When operating in the IGMP mode, messages are snooped between a router and a set-top box. Devices synchronize timers off of queries, and the devices further filter channel streams when a maximum number of responses are exceeded. Additionally, message filtering is used in order to determine upstream "leave" and "join" forwarding.

When operating in channel streaming mode, several benefits are provided. First, no router is needed. Secondly, no queries are required. Thirdly, no membership reports are generated in response to the queries. Instead, just "leaves" and "joins" are delivered from and to the set-top boxes. Devices disable timers that are used to time responses to queries (when operating in the other mode). The cleanup timer is disabled since queries will not be present. A linger timer is retained in an enabled mode in order to ensure maximum quality in the event of a slow "leave" or "join" at the service concentration platform or the service distribution platform.

In one case, the service distribution platform includes a Layer-2 Ethernet broadband device. The device is capable of receiving channels, filtering channels, and distributing channels based upon IGMP membership reports and IGMP "leaves". In one case, the service distribution platform receives channels from a digital turnaround source so as to retransmit previously encoded signals. The service distribution platform can receive channels from an encoder that encodes signals.

According to one construction, the set-top box includes a converter box having electronic circuitry that communicates with a television receiver. In one case, the set-top box is configured to forward a "leave" for a selected channel, and a corresponding entry in a multicast table for the selected table is altered in order to remove a receiving port from a portal table. In one case, the service concentration platform is configured to receive the "leave" for the selected channel when no other member is identified as being present on the portal. Furthermore, the multicast table is modified to remove the receiving port from a multicast entry for the channel.

For the case where the service distribution platform receives channels from a digital turnaround source so as to retransmit previously encoded signals, the service concentration platform can be configured to forward a "leave" for a selected channel to the service distribution platform. In one case, the multicast table is altered and the receiving port is removed from a corresponding channel entry in the multicast table.

According to one construction, the set-top box is configured to forward a "join" for a selected channel, and a corresponding entry in the multicast table for the selected channel is altered to add a receiving port to a portal table. In one case, the service concentration platform is configured to receive the "join" for the selected channel. In another case, the multicast table is modified to add the receiving port to a multicast entry for the channel. Furthermore, the service concentration platform can be configured to forward a "leave" for a selected channel to the service distribution platform. For this case, the multicast table is altered and the receiving port is removed from a corresponding channel entry in the multicast table.

Also according to one construction, a "leave" is forwarded when one of the set-top boxes provides a source of the "leave" and the set-top box is the last member of the corresponding channel entry on that particular service distribution platform port.

According to a further implementation of the present invention, a method is provided for controlling multicast video service. In order to implement the method, the following items are provided: a service distribution platform having a multicast table, at least one service concentration platform, a portal site, and at least one set-top box. According to one step, channels are received at the service distribution platform from an Internet protocol video source. According to another step, an entry is provided in the multicast table for each of the channels. According to yet another step, either a "join" or a "leave" is generated at a set-top box. According to a further step, messages are snooped from the set-top box to identify either the "join" or the "leave". According to another step, the identified "join" or "leave" is forwarded to the service distribution platform from the portal site via the service concentration platform. Finally, the identified "join" or "leave" is forwarded to one or more of the at least one service concentration platform. Here, the identified one of the "join" and the "leave" is snooped by portals and concentrators. The set-top box is further configured to receive additional "joins" and "leaves" from one or more of the at least one service concentration platform.

For one implementation of this method, generating includes generating a "join" at the portal site responsive to a user requesting a channel that is not presently provided as an entry on the multicast table. For one case, prior to receiving channels at the service distribution platform, all streams of channels from the Internet protocol video source are filtered.

For another implementation of this method, generating includes generating a "leave" at the portal site responsive to a user terminating a channel that is not also being used by another user via the portal site. For one case, prior to receiving channels at the service distribution platform, an operator defines ranges of multicast groups to be defined.

In another case, snooping includes implementing Internet Group Management Protocol (IGMP) snooping of messages from the set-top boxes to enable reporting of multicast group memberships via the portal site and the service concentration platforms to the service distribution platform. In one case, the method also includes generating an Internet Group Management Protocol (IGMP) membership report indicative of "joins" and used by the set-top box. In such case, the method can further include snooping the Internet Group Management Protocol (IGMP) membership report with at least one of a portal and a concentrator.

For the case where the service distribution platform includes a multicast table, channels can be manually placed into the multicast table, according to one implementation. In another case, the channels can be dynamically learned and filtered using a filter, upon ingress to the service distribution platform.

In one case, portal sites update multicast tables based on Internet Group Management Protocol (IGMP) snooping of messages from one or more of the set-top boxes where Internet Protocol (IP) multicast streams are used. In some cases, ranges of multicast groups are defined.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A multicast video service control system for Internet protocol television transport, comprising:
 a service distribution platform having a multicast table, the service distribution platform configured to receive channels from an Internet protocol video source and the multicast table configured to include an entry for each of the channels and to add and delete receiving ports as a result of receiving Ethernet packets comprising "joins" and "leaves" associated with the entry for each channel in the multicast table;
 a service concentration platform communicating with the service distribution platform by forwarding Ethernet packets comprising "leaves" and "joins" to the service distribution platform; and
 at least one set-top box physically distinct and remotely located from the service concentration platform communicating with the service concentration platform via Ethernet packets including a receiving port and configured to generate "leaves" and "joins" and forward the "leaves" and "joins" to the service concentration platform wherein the "leaves" and "joins" are snooped by portals connected between the at least one set-top box and the service concentration platform.

2. The system of claim 1 wherein the service distribution platform comprises a Layer 2 Ethernet broadband device.

3. The system of claim 2 wherein the Layer-2 Ethernet broadband device receives channels, filters channels, and distributes channels based upon IGMP membership reports and IGMP leaves.

4. The system of claim 2 wherein the service distribution platform receives channels from a digital turnaround source so as to retransmit previously encoded signals.

5. The system of claim 2 wherein the service distribution platform receives channels from an encoder that encodes signals.

6. The system of claim 1 wherein the set-top box comprises a converter box including electronic circuitry communicating with a television receiver.

7. The system of claim 1 wherein the set-top box is configured to forward a "leave" for a selected channel, and a corresponding entry in the multicast table for the selected channel is altered to remove a receiving port from a portal table.

8. The system of claim 7 wherein the service concentration platform is configured to receive the "leave" for the selected channel when no other member is identified as being present on the portal.

9. The system of claim 8 wherein the multicast table is modified to remove the receiving port from a multicast entry for the channel.

10. The system of claim 4 wherein the service concentration platform is configured to forward a "leave" for a selected channel to the service distribution platform.

11. The system of claim 10 wherein the multicast table is altered and the receiving port is removed from a corresponding channel entry in the multicast table.

12. The system of claim 1 wherein the set-top box is configured to forward a "join" for a selected channel, and a corresponding entry in the multicast table for the selected channel is altered to add a receiving port to a portal table.

13. The system of claim 12 wherein the service concentration platform is configured to receive the "join" for the selected channel.

14. The system of claim 1 wherein the multicast table is modified to add the receiving port to a multicast entry for the channel.

15. The system of claim 1 wherein the service concentration platform is configured to forward a "leave" for a selected Channel to the service distribution platform.

16. The system of claim 15 wherein the multicast table is altered and the receiving port is removed from a corresponding channel entry in the multicast table.

17. The system of claim 1 wherein the "leave" is forwarded when one of the set-top boxes provides a source of the "leave" and the set-top box is the last member of the corresponding channel entry on that particular service distribution platform port.

18. A method for controlling multicast video service, comprising:
   providing a service distribution platform having a multicast table, at least one service concentration platform, a portal site physically distinct and remotely located from the service concentration platform, and at least one set-top box;
   receiving channels at the service distribution platform from an Internet protocol video source;
   providing an entry in the multicast table for each of the channels;
   generating one of a "join" and a "leave" at a set-top box;
   snooping messages from the set-top box to identify the one of the "join" and the "leave";
   forwarding the identified one of the "join" and the "leave" to the service distribution platform from the portal site via the service concentration platform; and
   forwarding the identified one of the "join" and the "leave" to one or more of the at least one service concentration platform wherein the identified one of the "join" and the "leave" is snooped by portals and concentrators and wherein the set-top box is further configured to receive additional "joins" and "leaves" from one or more of the at least one service concentration platform.

19. The method of claim 18 wherein generating comprises generating a "join" at the portal site responsive to a user requesting a channel that is not presently provided as an entry on the multicast table.

20. The method of claim 18 wherein, prior to receiving channels at the service distribution platform, filtering all streams of channels from the Internet protocol video source.

21. The method of claim 18 wherein generating comprises generating a "leave" at the portal site responsive to a user terminating a channel that is not also being used by another user via the portal site.

22. The method of claim 18 wherein, prior to receiving channels at the service distribution platform, defining via an operator ranges of multicast groups to be defined.

23. The method of claim 18 wherein snooping comprises implementing Internet group management protocol snooping of messages from the set-top boxes to enable reporting of multicast group membership via the portal site and the service concentration platforms to the service distribution platform.

24. The method of claim 18 further comprising generating an Internet Group Management Protocol (IGMP) membership report indicative of "joins" and used by the set-top box.

25. The method of claim 24 further comprising snooping the IGMP membership report with at least one of a portal and a concentrator.

26. A system comprising:
   a first Ethernet packet switch configured to receive a set of multicast channels comprising multicast Ethernet packets from a multicast channel source;
   a second Ethernet packet switch physically distinct and remotely located from the first Ethernet packet switch in communication with the first Ethernet packet switch;
   a plurality of multicast receivers physically distinct and remotely located from both the first and second Ethernet packet switches in communication with the second packet switch;
   wherein the first Ethernet packet switch is configured to forward the set of multicast channels to the second Ethernet packet switch regardless of whether any of the channels of the set have been requested by any of the multicast receivers of the plurality; and
   wherein the second Ethernet packet switch is configured to forward those channels of the set that have been requested by one of the multicast receivers of the plurality and to discard those channels of the set that have not been requested by one of the multicast receivers of the plurality.

27. The system of claim 26 wherein the multicast channels comprise video content.

28. The system of claim 26 wherein the multicast channel source is a layer-three multicast router.

29. The system of claim 26 wherein the plurality of multicast receivers are connected to the second Ethernet packet switch via a plurality of third Ethernet packet switches and the plurality of third Ethernet packet switches are configured to receive the requested channels of the set from the second Ethernet packet switch and forward the requested channels to the multicast receivers of the plurality that have requested the requested channels.

* * * * *